United States Patent
Foxcroft et al.

(10) Patent No.: US 7,916,815 B2
(45) Date of Patent: *Mar. 29, 2011

(54) METHOD AND APPARATUS FOR A MULTICARRIER RECEIVER CIRCUIT WITH GUARD INTERVAL SIZE DETECTION

(75) Inventors: Thomas Foxcroft, Bristol (GB); Douglas Roger Pulley, Bath (GB)

(73) Assignee: Trident Microsystems (Far East) Ltd., Grand Cayman (KY)

( * ) Notice: Subject to any disclaimer, the term of this patent is extended or adjusted under 35 U.S.C. 154(b) by 983 days.

This patent is subject to a terminal disclaimer.

(21) Appl. No.: 11/685,196

(22) Filed: Mar. 12, 2007

(65) Prior Publication Data

US 2008/0107214 A1 May 8, 2008

Related U.S. Application Data

(63) Continuation of application No. 10/170,165, filed on Jun. 12, 2002, now Pat. No. 7,206,361.

(30) Foreign Application Priority Data

Jun. 13, 2001 (EP) .................................. 01305149

(51) Int. Cl.
  *H04L 27/06* (2006.01)
(52) U.S. Cl. .................................................... 375/343
(58) Field of Classification Search .......... 375/260–261, 375/285, 324, 326, 342–343, 346, 348, 350; 370/206, 208–209, 503
See application file for complete search history.

(56) References Cited

U.S. PATENT DOCUMENTS

| 5,559,833 | A | 9/1996 | Hayet |
| 5,602,835 | A | 2/1997 | Seki et al. |
| 5,802,117 | A | 9/1998 | Ghosh |
| 6,373,861 | B1 | 4/2002 | Lee |
| 6,630,964 | B2 | 10/2003 | Burns et al. |
| 6,928,048 | B1 | 8/2005 | Do et al. |
| 7,433,296 | B2 * | 10/2008 | Tsuie ........................... 370/203 |
| 2001/0033623 | A1 | 10/2001 | Hosur |

FOREIGN PATENT DOCUMENTS

| EP | 0 881 804 A1 | 12/1998 |
| EP | 0 895 388 A2 | 2/1999 |
| EP | 0 978 974 A2 | 2/2000 |
| EP | 0 998 068 A1 | 5/2000 |
| FR | 2 743 967 | 1/1996 |
| JP | 11127131 | 5/1999 |
| WO | 98 19410 | 5/1998 |
| WO | 99 17492 | 4/1999 |

OTHER PUBLICATIONS

Herbert Taub and Donald L. Schilling: Principles of Communication Systems, pp. 277-279, 2nd. ed. New York: McGraw-Hill, 1986.
European Patent Office European Search Report dated Nov. 16, 2001, for European Patent Application No. EP 01 30 5149.5.

* cited by examiner

*Primary Examiner* — Khanh C Tran
(74) *Attorney, Agent, or Firm* — DLA Piper LLP (US)

(57) ABSTRACT

A method and apparatus for a multicarrier receiver circuit with guard interval size detection described. The invention allows the FFT size and guard interval size to be detected quickly even in the presence of relatively noisy input signals. The method is robust in noise environments, and also sufficiently robust to process signals having severe multipath and/or co-channel interference. Moreover, the method is of low complexity, and can be implemented in a VLSI circuit.

20 Claims, 3 Drawing Sheets

METHOD AND APPARATUS FOR A MULTICARRIER RECEIVER CIRCUIT WITH GUARD INTERVAL SIZE DETECTION

CROSS-REFERENCE TO RELATED APPLICATION

The present patent application is a continuation Ser. No. 10/170,165 filed Jun. 12, 2002, now of U.S. Pat. No. 7,206,361, entitled "Method and Apparatus for a Multicarrier Receiver Circuit with Guard Interval Size Detection", issued on Apr. 17, 2007, which claims priority under 35 U.S.C. §119 (a)-(d) to European Patent Application No. 01305149.5, entitled "Multicarrier receiver with detection of the transmission mode and length of the guard interval", filed on Jun. 13, 2001, hereby incorporated by reference herein.

BACKGROUND

1. Field

This invention relates to the field of receiver circuits, more particularly to a method and apparatus for receiving signals in which a portion of a transmitted signal forms a guard interval.

2. Description of Related Art

The European DVB-T (Digital Video Broadcasting-Terrestrial) standard ETS 300 744 for digital terrestrial television (DTT) uses Coded Orthogonal Frequency Division Multiplexing (COFDM) of transmitted signals, which are therefore grouped into blocks and frames.

It is necessary to transmit the DTT signals over transmission paths, which are of uncertain quality. In particular, the area close to the transmission path may include objects such as tall buildings, which cause reflections. That is, a signal may be received at a receiver twice, once on a direct path from the transmitter, and then, after a short delay, as an indirect reflected path. As is well known, this can cause inter-symbol interference (ISI) in the receiver. To minimize this problem, DVB-T COFDM signals include a cyclic prefix guard interval (referred to hereinafter as "guard interval" or "guard period") to each active symbol. Specifically, the end portion of the active symbol is repeated before the current active symbol. These cyclic signals must be removed correctly before demodulation or the demodulation performance can be seriously degraded.

The DVB-T standard defines two possible "modes" of operation, each of which has a specific active window size, which in turn defines the size of the Fast Fourier Transform (FFT) in the receiver, namely 2 k mode and 8 k mode. For each of these modes the standard defines four possible guard lengths, which are fractions of the respective FFT length. The combination of FFT size and guard interval length can be selected based upon the anticipated multipath delay spread (which can be a function of transmission path topology and/or network topology in the case of a single frequency network (SFN)).

Before the cyclic signals can be removed it is necessary to know the FFT size and the duration of the guard interval. However, the duration of the guard interval, at least, is not a constant value. The presence of the guard interval reduces the efficiency with which the transmission channel can be used, and so it is advantageous to vary the size of the guard interval to be the minimum allowed by the conditions.

The receiver therefore includes a mechanism for determining the size of the guard interval. The chosen mechanism should be sufficiently robust to perform adequately under noisy signal conditions and with signals that suffer from multipath and co-channel interference.

Therefore, a need exists for a method and apparatus for a multicarrier receiver circuit with guard interval size detection that can be easily implemented and overcomes the disadvantages of other methods and apparatuses such as the above-described known system. The present disclosure provides such a multicarrier receiver circuit method and apparatus.

SUMMARY

The present invention provides a receiver circuit that rapidly determines an FFT size and guard interval size of a received signal. In addition, the present invention provides the FFT and guard interval size determination in cases where the received signals have relatively low signal-noise ratios.

The present invention relates to a method and apparatus for processing a received signal comprising a plurality of symbols used to determine a size of a guard interval therein. The invention forms a correlation function from the received samples, wherein the correlation function contains peaks. The separation between peaks in the correlation function depends upon a total duration of a symbol plus a guard interval. The correlation function is passed through a plurality of resonators, wherein resonators have respective resonance frequencies corresponding to a total duration of a symbol plus an available guard interval. The inventive method and apparatus selects a guard interval corresponding to the resonator with the highest output power as the size of the guard interval of the received signal.

The invention also relates to a receiver circuit that determines the size of the guard interval of a received signal in the aforementioned manner, thus providing a quick and robust manner of determining the guard interval size. In one embodiment, the invention determines a mode of receiving the signals by passing the correlation function through resonators that have respective resonance frequencies, which correspond to a total duration of a symbol in an available mode plus an available guard interval.

BRIEF DESCRIPTION OF THE DRAWINGS

Like reference numbers and designations in the various drawings indicate like elements.

DETAILED DESCRIPTION OF THE INVENTION

Throughout this description, the preferred embodiment and examples shown should be considered as exemplars, rather than as limitations to the present invention.

The method and apparatus for a multicarrier receiver circuit with guard interval size detection determines a guard interval size from a received multicarrier signal. The multicarrier receiver circuit generates a correlation function based upon a received multicarrier signal. The correlation function is passed to a plurality of resonators, wherein the resonators have resonance frequencies corresponding to guard interval sizes. The present invention selects the guard interval size based on the resonator having the highest output. Advantageously, the method is robust in noisy environments, and also sufficiently robust to process signals having multipath and/or co-channel interference characteristics.

Figure 1:
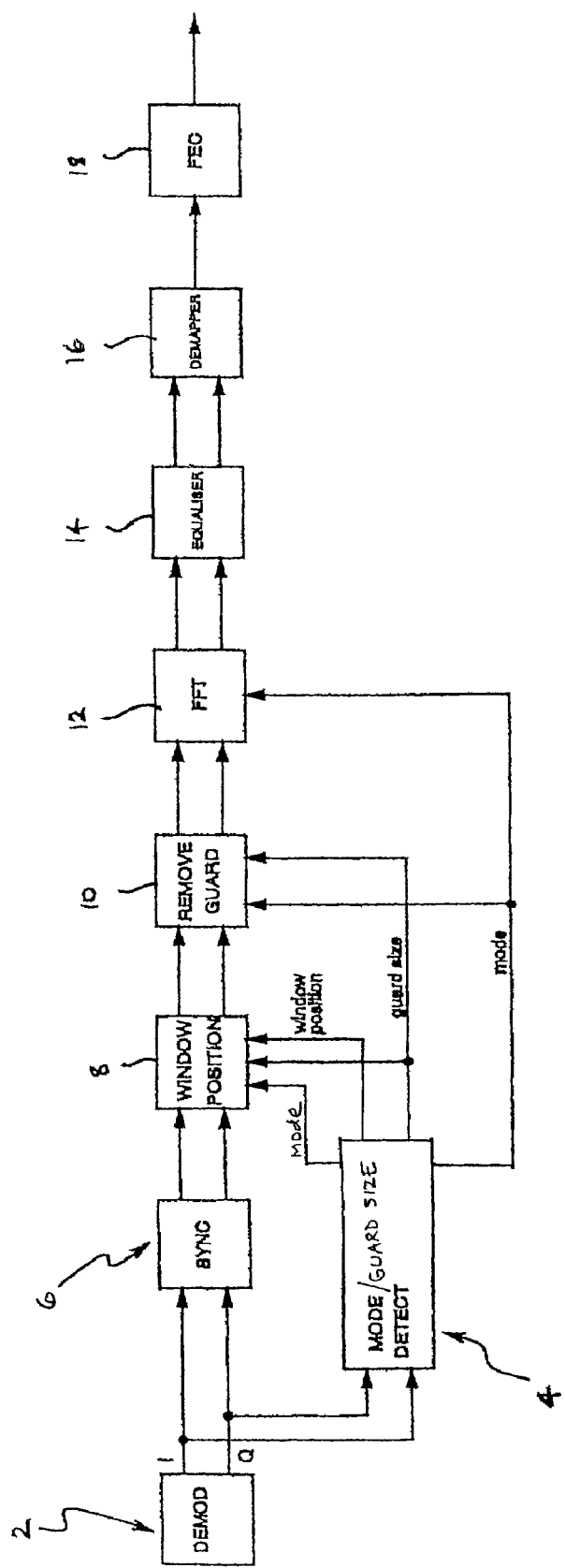
FIG. 1 is a block diagram of a receiver circuit adapted for use with the present invention

FIG. 1 is a block diagram of a receiver circuit adapted for use with the present apparatus and method. Typical digital terrestrial television signal receivers (e.g., receivers operating in accordance with the DVB-T standard with Coded Orthogonal Frequency Division Multiplexing (COFDM)) include an antenna and a tuner for receiving signals.

Referring now to FIG. 1, received signals are input to a demodulator 2, which mixes the received RF input signal down to baseband in-phase (I) and quadrature (Q) components and produces digital samples. As shown in FIG. 1, the baseband I and Q components are input to a mode and guard size detection block 4. The mode and guard size detection block 4 performs one or more of the following functions: determines whether the received signal was transmitted in "2 k" or "8 k" modes, determines the guard size (as described in more detail below), and provides corresponding mode detection and guard size outputs, and a window position output.

The baseband I and Q components are also input to a synchronizer circuit 6, which removes at least one of frequency and sampling rate offsets and inputs signals to a window position block 8. Following determination of the window position, the processed received signals are input to a guard removal block 10, FFT block 12, equalizer 14, demapper 16, and FEC block 18. The resulting data, such as MPEG encoded signal, is output to a demultiplexing device for ultimate display. It will also be apparent that changes can be made to the receiver circuit without diminishing its end effect. For example, the order of blocks in the circuit can be changed without significant impact to its performance.

The mode outputs, window position outputs and guard size outputs are supplied to the window position block 8. The mode outputs and guard size outputs are supplied to the guard removal block 10. The mode output is input to the FFT block 12, allowing these latter blocks to operate accurately.

Figure 2:
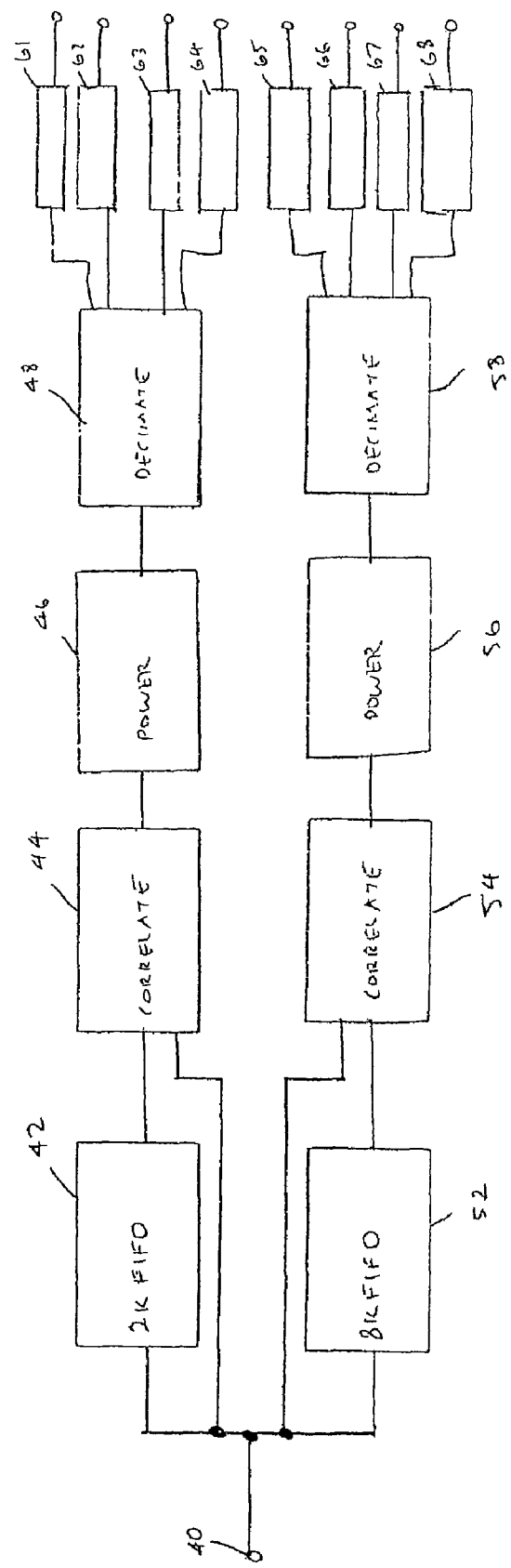
FIG. 2 is a block diagram of an exemplary embodiment of a component of the receiver circuit of FIG. 1.

FIG. 2 is a block diagram of an exemplary embodiment of the mode and guard size detection block of FIG. 1. As shown in FIG. 2, the mode and guard size detection block 4 includes an upper signal path and a lower signal path. The upper signal path corresponds to a 2K-carrier mode; the lower signal path corresponds to an 8K-carrier mode. The upper signal path includes blocks 42, 44, 46 and 48. The lower signal path includes blocks 52, 54, 56 and 58. Both the upper and lower signal paths are described in more detail hereinbelow.

Although other modes and guard sizes would operate with the described method and apparatus, in the DVB-T standard, there are two available carrier modes, namely "2 k" mode and "8 k" mode. In this context, "2 k" and "8 k" refer to the required effective size of the FFT block 12. In each of these carrier modes, there are four available guard intervals, namely $1/4$, $1/8$, $1/16$ and $1/32$, of the respective symbol duration. Some receivers are intended for use in transmission networks, in which only one of the available modes is used. In that case, it may not be necessary for the mode and guard size detection block 4 to provide an output that indicates the mode.

In one embodiment of the present invention, the I and Q samples of the received signal are supplied to an input terminal 40 of the mode and guard size detection block 4 (FIG. 1). The samples are supplied to a 2 k size first-in first-out (FIFO) memory 42. The moving average correlation of the samples over a minimum guard period is then calculated in block 44, and the power of the correlation measured in block 46.

In one embodiment, the correlation function is calculated in block 44 by multiplying input symbols with symbols contemporaneously obtained from the delay block 42 with the delay applied thereto, thereby obtaining a measure of the correlation between them. The results are then summed, and a running average is calculated over a number of samples "g", which is equal to the smallest allowed guard interval size, that is, $1/32$ of the FFT size. Thus, for example, g=64 samples in 2 k mode.

The blocks 44 and 46 therefore form a correlation function, and the separation between peaks in the correlation function depends on the total duration of the symbol plus the guard period. The resulting measurements are passed to a block 48 for decimation (i.e., removal of some proportion of the samples). This has the effect of easing implementation as it reduces the effective sampling rate.

As shown in the embodiment of FIG. 2, the input samples are also supplied to an 8 k size first-in first-out (FIFO) memory 52. The moving average correlation of the samples over a minimum guard period is then calculated in block 54, and the power of the correlation measured in block 56.

In one embodiment, the correlation function is calculated in block 54 by multiplying the input symbols with symbols contemporaneously obtained from the delay block 52 with the delay applied thereto, thereby obtaining a measure of the correlation between them. The results are then summed, and a running average is calculated over a number of samples "g", which is equal to the smallest allowed guard interval size, that is, $1/32$ of the FFT size. Thus, g=256 samples in 8 k mode.

The blocks 54 and 56 therefore form a correlation function, and the separation between peaks in the correlation function depends on the total duration of the symbol plus the guard period. The resulting measurements are passed to a block 58 for decimation (i.e., removal of a proportion of the samples), as described above.

The samples remaining after decimation in blocks 48 and 58 are then passed through resonators 61-68 as shown in FIG. 2. Thus, samples from block 48 are passed through resonators 61-64. Similarly, the samples from block 58 are passed through resonators 65-68.

An exemplary set of resonators is implemented using a set of filters, wherein individual filters are centered at a respective resonance frequency. In this embodiment, the resonators have resonance frequencies based on the COFDM symbol frequency of a particular combination of the mode and the guard interval.

Thus, in 2 k mode, the active symbol duration is 224 µs, while the guard interval can be $1/4$, $1/8$, $1/16$ or $1/32$ of the respective symbol duration, namely 56 µs, 28 µs, 14 µs or 7 µs. Therefore, the total duration of the symbol plus the guard period can be 280 µs, 252 µs, 238 µs or 231 µs. In 8 k mode, the active symbol duration is 896 µs, while the guard interval can again be $1/4$, $1/8$, $1/16$ or $1/32$ of the respective symbol duration, namely 224 µs, 112 µs, 56 µs or 28 µs. The total duration of the symbol plus the guard period can therefore be 1120 µs, 1008 µs, 952 µs or 924 µs.

More specifically, resonance frequencies correspond to the sample rate divided by the number of samples in the FFT and in the guard interval together, after taking into account the sample rate decimation, for one of the possible combinations of the mode and the guard size. In one embodiment, the resonance frequency corresponds to an integer multiple of the sample rate divided by the number of samples in the FFT and in the guard interval together.

In one embodiment of the invention, the decimator 58 in the 8 k signal path has four times the decimation of the decimator 48 in the 2 k signal path. Specifically, the decimator 48 decimates by a factor of 8, and the decimator 58 decimates by a factor of 32. The result of this embodiment is that the two decimators (48, 58) each produce outputs that contain an equal number of samples per symbol.

As a consequence, the resonators 61 and 65 can be identical, as can the resonators 62 and 66, 63 and 67, and 64 and 68.

Those skilled in the signal processing art shall recognize that non-identical resonators can be used with the present invention without departing from the scope or spirit of the present invention. It is also possible that a single bank of resonators could be provided, shared between the 2 k signal path and the 8 k signal path.

In one embodiment, the resonators have a resonance frequency at the third harmonic of the rate derived in the above-described manner. In this embodiment the filtering ability (or quality factor, Q) can increase for higher harmonics. The signal power decreases at higher harmonics.

The peak power generated by a resonator is determined over a maximal symbol length (i.e., the symbol length if it had a maximum guard). A counter (not shown) is provided at the output of each of the resonators 61-68, and each counter increments when its peak power is largest. The peak powers produced by each resonator are then compared.

The resonator having a resonance frequency corresponding most closely to a harmonic of the COFDM symbol frequency (for the combination of the mode and the guard interval that is actually in use) produces the highest output power. Therefore, the comparison of the resonator peak powers indicates the frequency corresponding to the actual symbol duration (active symbol duration plus guard period) in the received signals.

Thus, in this embodiment, by examining the counter values after a number of symbols, the counter with the highest value is determined to be the one that corresponds to the mode (either 2 k or 8 k) and guard period used by the transmitted signal. As previously described, these output parameters could then be used in the further processing of the received signals.

Figure 3:
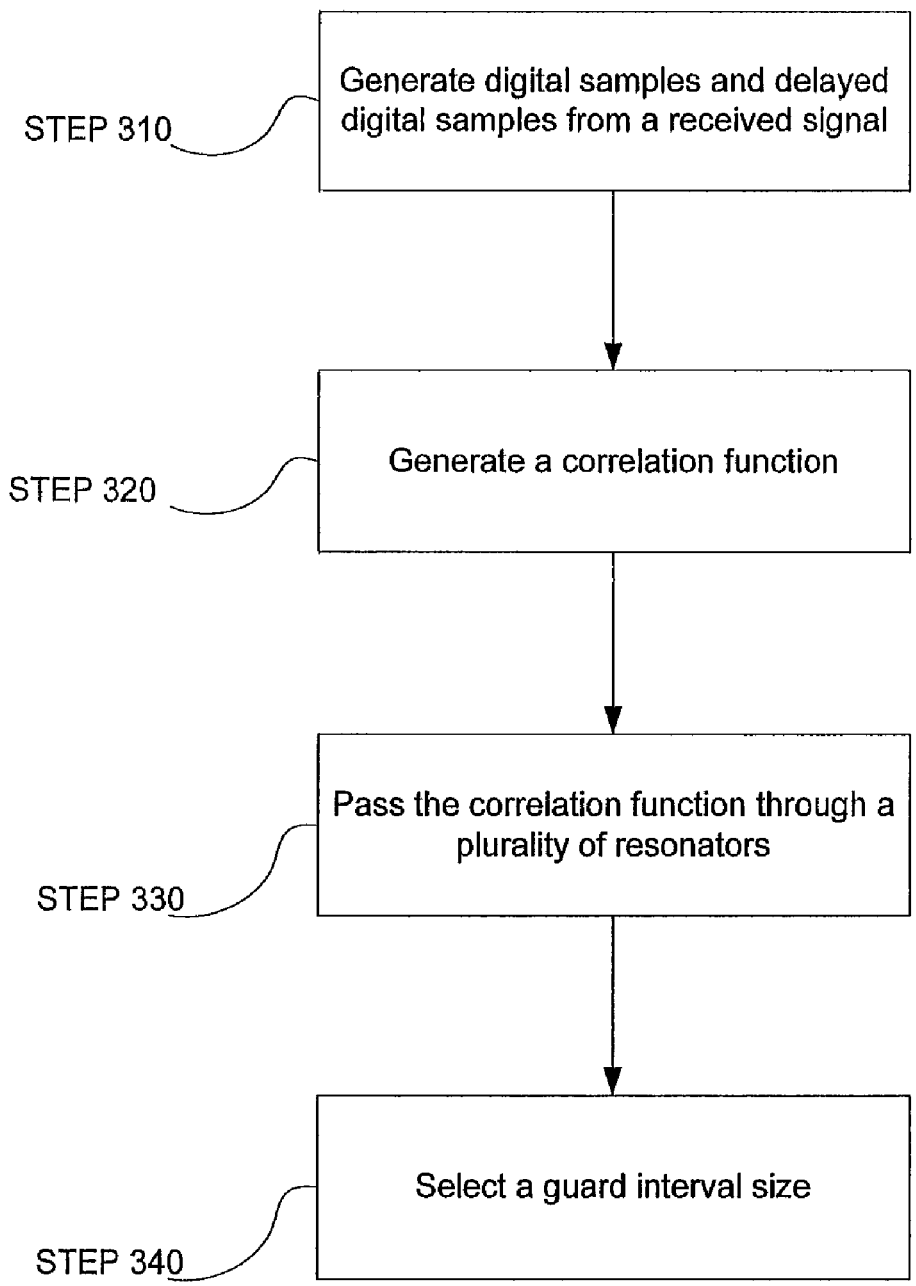
FIG. 3 shows a flowchart of the method of processing a received signal.

FIG. 3 shows a flowchart of the method of processing a received signal. As shown in FIG. 3, the method 300 begins at a STEP 310 whereat the method 300 generates digital samples and delayed digital samples from a received signal. After the STEP 310, the method 300 proceeds to a STEP 320 whereat the method 300 generates a correlation function based on the digital samples and delayed digital samples generated in the STEP 310. In one embodiment, the correlation function is also based on a total symbol duration and a guard period. After the STEP 320, the method 300 proceeds to a STEP 330 whereat the method 300 passes the correlation function through a plurality of resonators. In one embodiment, resonators correspond to various guard interval sizes and have resonance frequencies based on a mode and a guard interval. After the STEP 330, the method 300 proceeds to a STEP 340 whereat the method 300 selects a guard interval size based on the resonator having the highest power output of the plurality of resonators. In one embodiment, the STEP 340 determines a peak power output over a maximal symbol length.

In an exemplary embodiment, the STEP 310 generates a first set of delayed digital samples and a second set of delayed digital samples, wherein the first set and the second set have different delays. In the exemplary embodiment, the STEP 320 generates correlation functions corresponding to both sets of delayed digital samples. The STEP 330 uses these correlation functions generated in the STEP 320.

In one embodiment, the STEP 320 further comprises measuring a correlation function power from the correlation function. In one embodiment, the STEP 320 further comprises averaging the correlation function over a number of samples, wherein the number of samples corresponds to a smallest allowed guard interval size. In one embodiment, the STEP 320 generates a correlation function by multiplying a digital sample symbol by a delayed digital sample symbol.

In one embodiment, the STEP 330 further comprises decimating the correlation function prior to passing the correlation function through the plurality of resonators. In another embodiment, the STEP 330 comprises passing the correlation function through the plurality of resonators, wherein resonators have a resonance frequency of a third harmonic of a sample rate divided by a number of samples in an FFT and a guard interval. In another embodiment, the STEP 330 comprises passing the correlation function through the plurality of resonators, wherein resonators have a resonance frequency of a sample rate divided by a number of samples in an FFT and a guard interval. In another embodiment, the STEP 330 comprises passing the correlation function through the plurality of resonators, wherein resonators have a resonance frequency of an integer multiple of a sample rate divided by a number of samples in an FFT and a guard interval. In another embodiment, the STEP 330 comprises passing the correlation function through the plurality of resonators, wherein resonators have a resonance frequency of an integer multiple of a sample rate divided by a number of samples in an FFT and a guard interval, and further divided by a sample rate decimation.

SUMMARY

A novel multicarrier receiver apparatus and method with guard interval size detection have been described. The described method and apparatus for a demodulator multicarrier receiver circuit with guard interval size detection allows the FFT size and guard interval size to be detected, even in the presence of relatively noisy input signals. The method is robust in noisy environments, and also sufficiently robust to process signals having severe multipath and/or co-channel interference. Moreover, the method is of low complexity. The apparatus and method are described with particular reference to the DVB-T standard. However, the same are applicable to any receiver that is intended for use in transmission systems having multiple available combinations of guard intervals and FFT sizes.

A number of embodiments have been described. Nevertheless, it will be understood that various modifications may be made without departing from the scope or spirit of the invention. For example, the method and apparatus can be implemented in software, hardware, or in a software/hardware combination. Furthermore, the method and apparatus can be used in virtually any type of communication system. Its use is not intended to be limited to a European DVB-T standard-based communication system. For example, the present invention can be used in a North American television standard-based communication system. Accordingly, it is to be understood that the invention is not to be limited by the specific illustrated embodiment, but only by the scope of the appended claims.

What is claimed is:

1. A method of processing a received signal comprising:
   (a) passing a correlation function through a plurality of resonators, wherein at least one resonator corresponds to a guard interval size, and wherein at least one resonator has a resonance frequency based on a mode and a guard period; and
   (b) selecting the guard interval size corresponding to a resonator having a highest output power, wherein the correlation function is generated from samples and delayed samples generated from the received signal.

2. The method of claim 1, wherein the correlation function is based on a multiple symbol duration and the guard period.

3. The method of claim 1 further comprising: (c) generating the correlation function from samples and delayed samples generated from the received signal.

4. The method as set forth in claim 1, wherein the act (a) comprises the sub-acts of:
(1) decimating the correlation function; and
(2) passing the correlation function through a plurality of resonators, wherein at least one resonator corresponds to a guard interval size, and wherein at least one resonator has a resonance frequency based on a mode and the guard period.

5. The method as set forth in claim 1, wherein the act (b) comprises the sub-acts of:
(1) determining a peak power output of at least one resonator of the plurality of resonators over a maximal symbol length; and
(2) selecting the guard interval size that corresponds to a resonator having the highest frequency of peak power outputs.

6. The method as set forth in claim 5, wherein the sub-act (2) comprises the sub-acts of:
a) incrementing a counter associated with a resonator when the peak power output of the resonator is above a predetermined threshold; and
b) selecting the guard interval size that corresponds to a resonator associated with a highest counter value.

7. The method as set forth in claim 1, wherein the correlation function comprises peaks, and wherein a separation between peaks depends on a total duration of a symbol plus the guard period.

8. The method as set forth in claim 1, wherein at least one of the plurality of resonators comprises a filter.

9. The method as set forth in claim 1, wherein the received signal is processed in a television, personal recorder, a set-top box, a personal digital assistant (PDA), or a computer.

10. A receiver circuit comprising:
a mode detection device and a guard size detection device, adapted to receive a digital sample signal, wherein at least one of the mode detection device and the guard size detection device determines a received signal guard interval size, comprising:
(1) a buffer device, adapted to receive the digital sample signal generated from I and Q component signals, wherein the buffer device generates and outputs a delayed digital sample signal and the I and Q component signals are generated from the received signal;
(2) a correlation measurement device, adapted to receive the digital sample signal and the delayed digital sample signal, operatively connected to the buffer device, wherein the correlation measurement device generates and outputs a correlation function based on the digital sample signal and the delayed digital sample signal; and
(3) a plurality of resonators, adapted to receive the correlation function, operatively connected to the correlation measurement device, wherein at least one resonator of the plurality of resonators has a resonance frequency based on a mode and a guard period, and wherein at least one resonator of the plurality of resonators corresponds to a guard interval size, and wherein the received signal guard interval size corresponds to the guard interval size corresponding to a resonator having a highest power output.

11. The receiver circuit as set forth in claim 10, wherein the buffer device comprises:
a first buffer adapted to generate a first set of digital samples corresponding to a first delay; and
a second buffer adapted to generate a second set of digital samples corresponding to a second delay.

12. The receiver circuit as set forth in claim 10, wherein the correlation measurement device comprises:
a first correlator adapted to receive the digital sample signal and the first set of digital samples to generate a first correlation function; and
a second correlator adapted to receive the digital sample signal and the second set of digital samples to generate a second correlation function.

13. The receiver circuit as set forth in claim 10, wherein the correlation measurement device comprises:
a correlator; and
a correlation function power measurement device, and/or a decimator.

14. The receiver circuit as set forth in claim 10, wherein the mode and guard size detection devices further comprise a guard interval size detection device, operatively coupled to the plurality of resonators, adapted to detect the resonator having the highest power output.

15. The receiver circuit as set forth in claim 14, wherein the guard interval size detection device detects a peak power output of one of the plurality of resonators over a maximal symbol length.

16. The receiver circuit as set forth in claim 14, wherein the guard interval size detection device comprises a counter, wherein the counter is associated with one of the plurality of resonators.

17. The receiver circuit as set forth in claim 10, wherein at least one of the plurality of resonators comprises a filter.

18. The receiver circuit as set forth in claim 10, wherein the receiver circuit is operatively coupled to a television, a personal recorder, a set-top box, a personal digital assistant (PDA), or a computer.

19. A communication system including at least one transmitter and at least one receiver, the communication system comprising: (a) at least one transmitter; and (b) at least one receiver comprising the receiver circuit as set forth in claim 10.

20. The communication system as set forth in claim 19, wherein the communication system further comprises at least one of the group consisting of a television, a personal recorder, a set-top box, a personal digital assistant (PDA) and a computer operatively coupled to the at least one receiver.

* * * * *